(12) United States Patent
Edwards et al.

(10) Patent No.: US 8,899,679 B2
(45) Date of Patent: Dec. 2, 2014

(54) SEAT ASSEMBLY HAVING A FOLD ASSIST MECHANISM

(71) Applicant: Lear Corporation, Southfield, MI (US)

(72) Inventors: Chris Edwards, Staffordshire (GB); Adrian Lewis, Nuneaton (GB); Raymond Lloyd, Staffordshire (GB)

(73) Assignee: Lear Corporation, Southfield, MI (US)

( * ) Notice: Subject to any disclaimer, the term of this patent is extended or adjusted under 35 U.S.C. 154(b) by 209 days.

(21) Appl. No.: 13/625,084

(22) Filed: Sep. 24, 2012

(65) Prior Publication Data

US 2014/0084657 A1 Mar. 27, 2014

(51) Int. Cl.
*B60N 2/20* (2006.01)

(52) U.S. Cl.
USPC .................. 297/292; 297/354.1; 297/378.1

(58) Field of Classification Search
USPC ............. 297/292, 293, 378.1, 378.12, 378.14
See application file for complete search history.

(56) References Cited

U.S. PATENT DOCUMENTS

| | | | |
|---|---|---|---|
| 376,886 A * | 1/1888 | Holden | 297/292 |
| 5,413,401 A | 5/1995 | Koyanagi | |
| 5,707,111 A * | 1/1998 | Kim | 297/378.12 |
| 5,803,546 A | 9/1998 | Yamazaki | |
| 6,290,297 B1 * | 9/2001 | Yu | 297/378.12 |
| 6,345,867 B1 * | 2/2002 | Hellrung et al. | 297/336 |
| 7,344,195 B2 * | 3/2008 | Folkert et al. | 297/378.1 |
| 7,494,186 B2 | 2/2009 | Paing et al. | |
| 7,543,890 B1 * | 6/2009 | Sasaki et al. | 297/378.12 |
| 7,775,591 B2 * | 8/2010 | Hahn et al. | 297/341 |
| 8,096,618 B2 * | 1/2012 | Bruck et al. | 297/378.11 |
| 8,348,346 B2 | 1/2013 | Li | |
| 8,506,013 B2 * | 8/2013 | Esaki et al. | 297/301.4 |
| 2005/0046261 A1 * | 3/2005 | Grable et al. | 297/378.1 |
| 2006/0033372 A1 * | 2/2006 | Lee | 297/378.1 |
| 2008/0067851 A1 | 3/2008 | Tomandl | |
| 2009/0079246 A1 * | 3/2009 | Okura et al. | 297/301.4 |
| 2009/0174243 A1 * | 7/2009 | Nathan et al. | 297/325 |
| 2010/0314920 A1 * | 12/2010 | Arata et al. | 297/217.3 |
| 2011/0080029 A1 | 4/2011 | Shimizu | |

FOREIGN PATENT DOCUMENTS

| | | |
|---|---|---|
| EP | 2213509 A1 | 8/2010 |
| GB | 1090440 A | 11/1967 |
| GB | 1090770 | 11/1967 |

OTHER PUBLICATIONS

Intellectual Property Office, Combined Search and Examination Report for the corresponding GB Patent Application No. GB1306873.9 dated Oct. 10, 2013.

UK Intellectual Property Office, Examination Report for the corresponding UK Patent Application No. GB1306873.9 mailed Jul. 4, 2014.

* cited by examiner

*Primary Examiner* — David R Dunn
*Assistant Examiner* — Timothy J Brindley
(74) *Attorney, Agent, or Firm* — Brooks Kushman P.C.

(57) ABSTRACT

A seat assembly having a seat back and a fold assist mechanism. The fold assist mechanism may have a drive plate and a spring. The spring may bias the seat back from a first position toward the second position when the spring engages a drive plate flange.

20 Claims, 3 Drawing Sheets

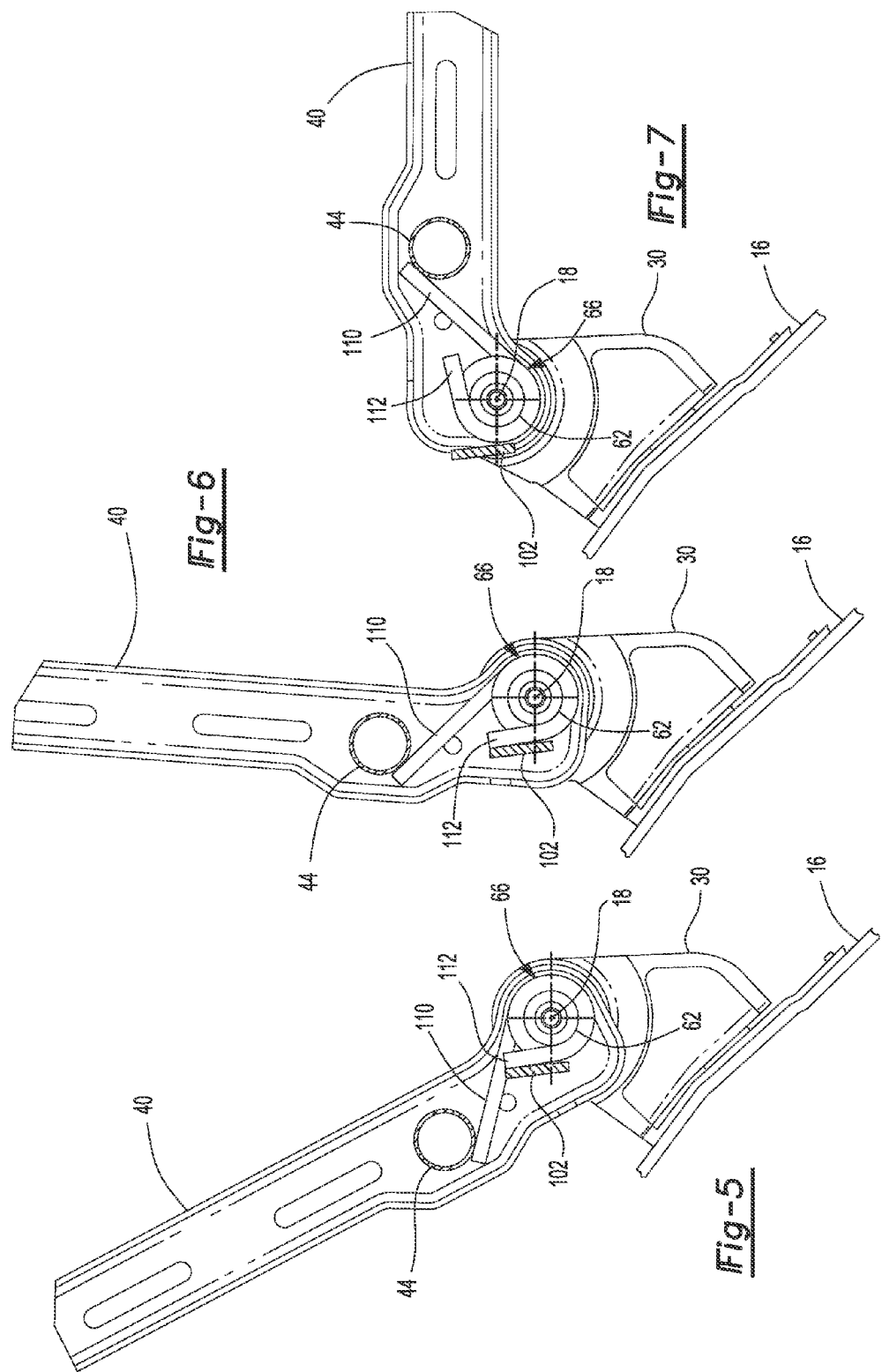

SEAT ASSEMBLY HAVING A FOLD ASSIST MECHANISM

TECHNICAL FIELD

This patent application relates to a seat assembly having a fold assist mechanism.

BACKGROUND

A storage assist device for a vehicle seat is disclosed in U.S. Pat. No. 8,480,152.

SUMMARY

In at least one embodiment, a seat assembly is provided. The seat assembly may include a mounting bracket, a seat back, and a fold assist mechanism. The mounting bracket may be configured to be mounted on a support surface. The seat back may have a seat back frame and may be configured to move between a first position and a second position. The fold assist mechanism may include a shaft, a drive plate, and a spring. The shaft may be disposed proximate the mounting bracket and may support the seat back frame. The drive plate may be disposed proximate the shaft and may have a drive plate flange. The drive plate flange may be spaced apart from the shaft and may extend toward the seat back frame. The spring may be rotatably disposed on the shaft. The spring may exert a biasing force on the seat back frame that biases the seat back toward the second position when the spring engages the drive plate flange.

In at least one embodiment, a seat assembly is provided. The seat assembly may include a mounting bracket, a seat back, and a fold assist mechanism. The seat back may be configured to pivot about an axis between a first position and a second position. The seat back may have a seat back frame. The seat back frame may include a side member and a cross member. The side member may have a side member hole. The cross member may be disposed proximate the side member. The fold assist mechanism may include a shaft, a drive plate, and a spring. The shaft may be fixedly disposed on the mounting bracket and may extend through the side member hole to pivotally support the seat back frame. The drive plate may be fixedly disposed on the shaft. The drive plate may have a drive plate flange that may be spaced apart from the shaft. The spring may be rotatably disposed on the shaft. The spring may exert a biasing force on the cross member to bias the seat back toward the second position when the spring engages the drive plate flange.

In at least one embodiment, a seat assembly may be provided. The seat assembly may include a mounting bracket, a seat back, and a fold assist mechanism. The seat back may be configured to pivot about an axis between a first position and a second position. The seat back may have a seat back frame. The fold assist mechanism may include a shaft, a drive plate, and a spring. The shaft may support the seat back frame and may have a first portion and a second portion. The first portion may be fixedly disposed on the mounting bracket. The second portion may be disposed opposite the first portion. The drive plate may be fixedly disposed at a second end of the shaft. The drive plate may have a drive plate flange that may be spaced apart from the shaft and may extend toward the seat back frame. The spring may be rotatably disposed on the shaft. The spring may bias the seat back toward the second position when the spring engages the seat back frame and the drive plate flange.

BRIEF DESCRIPTION OF THE DRAWINGS

FIGS. 5-7 are side section views of a portion of the seat assembly illustrating folding of the seat assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
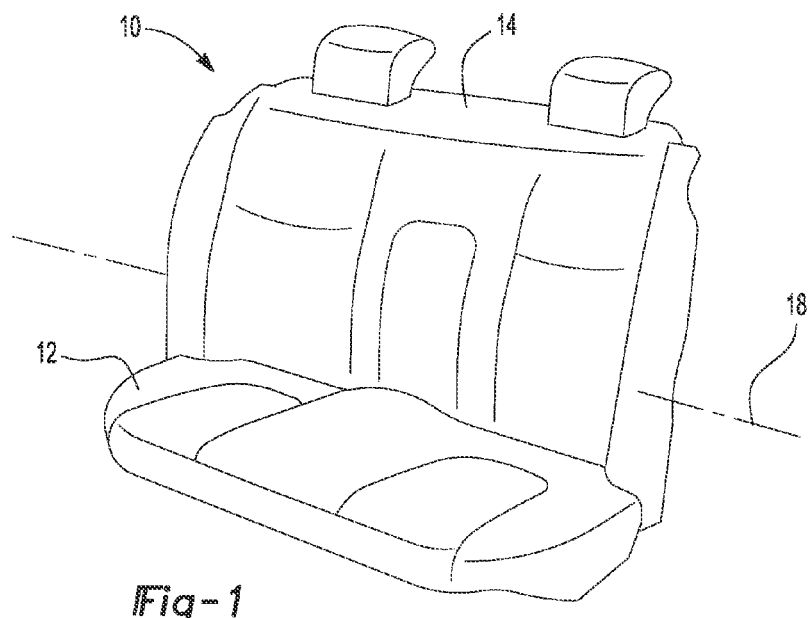
FIG. 1 is a perspective view of a seat assembly.
Figure 2:
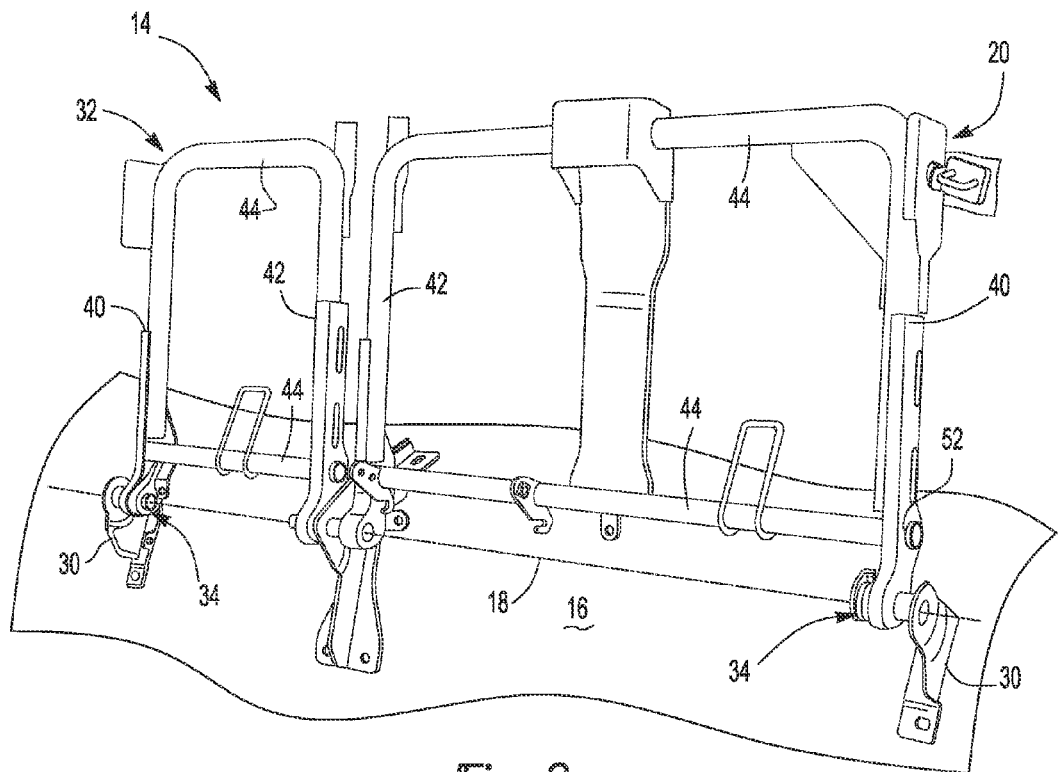
FIG. 2 is a perspective view of a portion of the seat assembly including a seat back frame and a fold assist mechanism.

Referring to FIGS. 1 and 2, an exemplary seat assembly 10 is shown. The seat assembly 10 may be configured for use in a vehicle, such as a motor vehicle like a car or truck. In FIG. 1, the seat assembly 10 is configured as a rear seat that may be disposed in a seating row that may be located behind a front seating row of the vehicle. The seat assembly 10 may include a seat bottom 12 and a seat back 14.

The seat bottom 12 may be configured to receive and support one or more seat occupants. The seat bottom 12 may be disposed on a support surface 16, such as a floor pan of the vehicle.

The seat back 14 may be disposed proximate the seat bottom 12. The seat back 14 may be configured to support the back and/or head of a seat occupant. The seat back 14 may be configured to pivot with respect to the seat bottom 12. More specifically, the seat back 14 may pivot about an axis 18 between a first position and a second position. In the first position, the seat back 14 may extend at an angle with respect to the seat bottom 12 to permit the seat assembly 10 to be occupied by a seat occupant. In the second position, at least a portion of the seat back 14 may be folded over the seat bottom 12. As such, the seat back 14 may engage the seat bottom 12 and may be disposed in a generally horizontal position or at a small acute angle with respect to the seat bottom 12.

The seat back 14 may or may not have a split configuration that allows different portions of the seat back 14 to move independently. In FIG. 2, the seat back 14 is configured with a 60/40 split configuration. The seat back 14 may also include one or more latch mechanisms 20 that may be configured to permit or inhibit folding or pivotal movement of the seat back 14. For example, the latch mechanism 20 may be configured to selectively engage a striker that may be fixedly disposed on the vehicle. As such, the latch mechanism 20 may engage or latch to the striker to hold the seat back 14 in the first position and may disengage the striker to permit the seat back 14 to fold or pivot from the first position toward the second position. Alternatively, one or more latch mechanisms 20 may be mounted on the vehicle and one or more strikers may be mounted on the seat back 14 in various embodiments.

Figure 3:
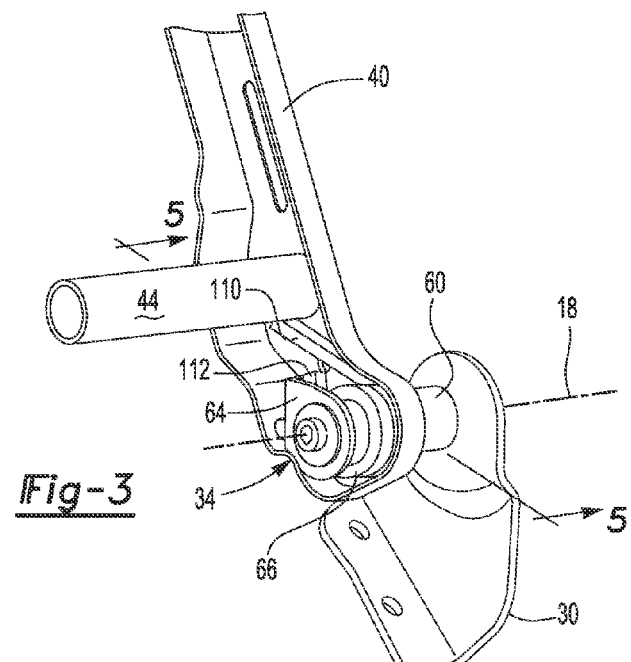
FIG. 3 is a magnified view of the fold assist mechanism.
Figure 4:
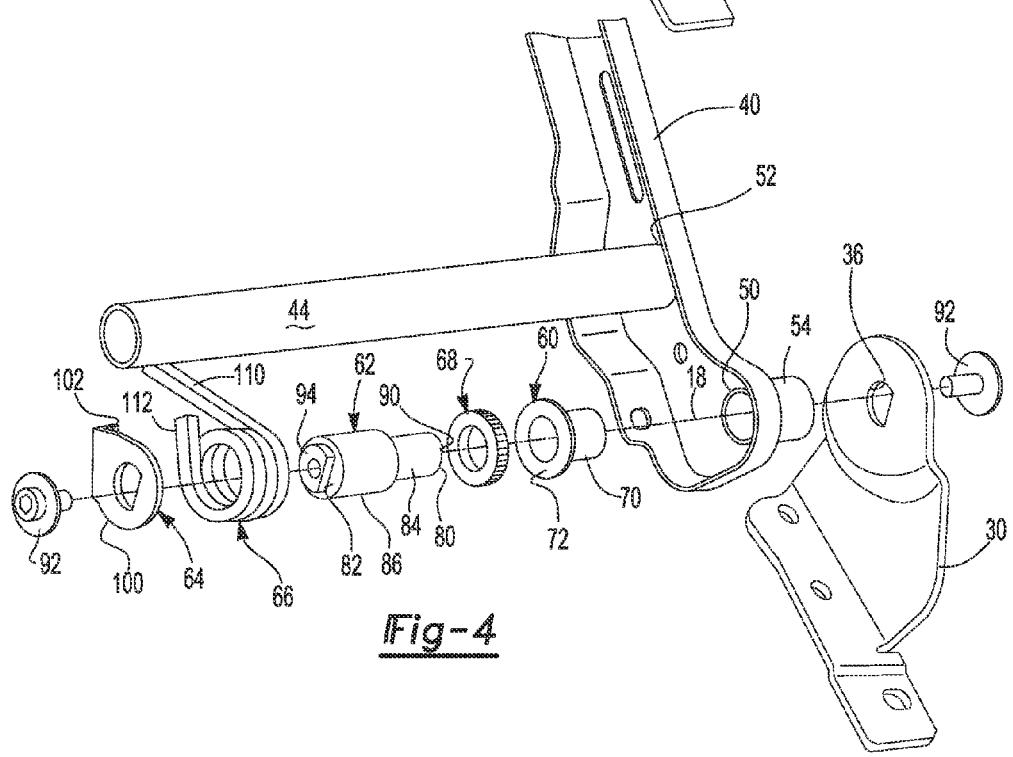
FIG. 4 is an exploded view of the fold assist mechanism.

Referring to FIGS. 2-4, a portion of the seat assembly 10 is shown without a trim cover, cushion, and head restraints to more clearly illustrate various components. The seat assembly 10 may include one or more mounting brackets 30, a seat back frame 32, and at least one fold assist mechanism 34.

The mounting brackets 30 may facilitate mounting of the seat assembly 10 to the vehicle. For instance, the mounting brackets 30 may be fixedly disposed on the support surface 16 in any suitable manner, such as with one or more fasteners like a bolt. The mounting brackets 30 may have a one-piece construction or multi-piece construction to provide additional reinforcement. In FIG. 2, three mounting brackets are shown; however, a lesser number of mounting brackets 30 may be provided. As is best shown in FIG. 4, a mounting bracket 30 may include a mounting hole 36 that may be disposed along the axis 18.

The seat back frame 32 may provide structural support for the seat back 14. In at least one embodiment, the seat back frame 32 may include a first side member 40, a second side member 42, and a pair of cross members 44.

The first and second side members 40, 42 may be disposed on opposite lateral sides of the seat back frame 32 or split portions of the seat back 14. The first and second side members 40, 42 may be spaced apart from each other and may extend generally between the top and bottom of the seat back 14. In one or more embodiments, the first and second side members 40, 42 may be assembled from or may include multiple components. In addition, the first side member 40 may be formed with side walls that extend away from the mounting bracket 30 to at least partially extend around the fold assist mechanism 34.

As is best shown in FIG. 4, the first side member 40 may include a first side member hole 50 and a second side member hole 52. The first side member hole 50 may receive a bushing 54. The bushing 54 may be coaxially disposed with the axis 18 and the first side member hole 50 and may extend from the first side member 40 toward the mounting bracket 30. As such, the bushing 54 may act as a spacer that separates or spaces the first side member 40 apart from the mounting bracket 30. In addition, the first side member hole 50 may receive the fold assist mechanism 34 will be described in more detail below. The second side member hole 52 may be spaced apart from the first side member hole 50 and may be configured to receive a cross member 44.

The cross members 44 may extend from the first side member 40 to the second side member 42. The cross members 44 may be spaced apart from each other and may be disposed near the top and bottom of the seat back 14. The cross members 44 may be integrally formed with the first and/or second side members 40, 42 in one or more embodiments.

At least one fold assist mechanism 34 may be provided with the seat assembly 10. In FIG. 2, two fold assist mechanisms 34 are shown, but a single fold assist mechanism 34 may be employed with a seat back 14 that does not have a split fold configuration. As is best shown in FIGS. 3 and 4, the fold assist mechanism 34 may include a bearing 60, a shaft 62, a drive plate 64, a spring 66, and a spacer 68.

The bearing 60 may facilitate rotation of the seat back frame 32 with respect to the shaft 62. The bearing 60 may extend along the axis 18 and may have a body portion 70 and a flange 72. The body portion 70 may be generally cylindrical and may extend through the first side member hole 50 and into the bushing 54. The flange 72 may be disposed at an end of the body portion 70 and may extend radially away from the axis 18. The flange 72 may engage the first side member 40 to inhibit movement along the axis 18 or axial movement of the bearing 60 toward the mounting bracket 30.

The shaft 62 may extend from the mounting bracket 30 and support the seat back frame 32. The shaft 62 may be fixedly disposed on the mounting bracket 30 such that the shaft 62 does not rotate about the axis 18. The shaft 62 may include a first end 80, a second end 82, a first portion 84, and a second portion 86.

The first end 80 may be disposed proximate the mounting bracket 30. The first end 80 may have a first protrusion 90. The first protrusion 90 may be received in the mounting hole 36 of the mounting bracket 30. The first protrusion 90 may cooperate with the mounting hole 36 to inhibit rotation of the shaft 62 about the axis 18. For example, the first protrusion 90 and mounting hole 36 may have non-circular configurations that mate to inhibit rotation of the shaft 62 with respect to the mounting bracket 30. In the embodiment shown, the first protrusion 90 and mounting hole 36 have generally D-shaped configurations. A fastener 92 may extend through the mounting hole 36 to the first end 80 to couple the shaft 62 to the mounting bracket 30. In FIG. 4, the fastener 92 includes a bolt and a washer.

The second end 82 may be disposed opposite the first end 80. The second end 82 may have a second protrusion 94. The second protrusion 94 may be disposed proximate or may engage the drive plate 64. As such, the second protrusion 94 may inhibit rotation of the drive plate 64 about the axis 18 or with respect to the shaft 62 as will be discussed in more detail below.

The first portion 84 may extend from the first end 80 toward the second end 82. More specifically, the first portion 84 may extend through the first side member hole 50, the bushing 54, and the bearing 60. The first portion 84 may have a first diameter.

The second portion 86 may extend from the second end 82 to the first portion 84. The second portion 86 may engage the spring 66 and drive plate 64. The second portion 86 may have a second diameter that may be larger than the first diameter.

The drive plate 64 may be fixedly disposed on the shaft 62. In at least one embodiment, the drive plate 64 may include a drive plate hole 100 and a drive plate flange 102.

The drive plate hole 100 may be configured to receive a portion of the shaft 62, such as the second protrusion 94. The drive plate hole 100 and second protrusion 94 may have non-circular configurations that may mate or cooperate to inhibit rotation of the drive plate 64 with respect to the shaft 62. In the embodiment shown, the second protrusion 94 and drive plate hole 100 have generally D-shaped configurations. A fastener 92 may extend through the drive plate hole 100 to couple the drive plate 64 to the shaft 62.

The drive plate flange 102 may be spaced apart from the shaft 62 and the drive plate hole 100. The drive plate flange 102 may be bent or angled to extend toward a portion of the seat back frame 32, such as the first side member 40. The drive plate flange 102 may be engaged or disengaged by the spring 66 as will be discussed in more detail below.

The spring 66 may be configured to exert a biasing force on the seat back frame 32 to actuate or assist movement of the seat back 14 from the first position toward the second position. The spring 66 may exert a biasing force on the seat back frame 32 over a portion of the range of movement of the seat back 14. For instance, the spring 66 may not bias the seat back 14 toward the second position when the spring 66 is disengaged from the drive plate flange 102 as will be discussed in more detail below. The spring 66 may be coiled around the shaft 62. In addition, the spring 66 may be rotatably disposed on the shaft 62 between the drive plate 64 and the flange 72 of the bearing 60. The spring 66 may have a first arm 110 and a second arm 112.

The first arm 110 may engage a portion of the seat back frame 32, such as a cross member 44. The first arm 110 may be disposed adjacent to the spacer 68 and may engage the cross member 44 throughout the range of motion of the seat back 14.

The second arm 112 may be disposed opposite the first arm 110. The second arm 112 may be shorter than the first arm 110 and may be disposed adjacent to the drive plate 64. The second arm 112 may or may not engage the drive plate flange 102 depending on the rotational position of the seat back 14. As such, the spring 66 may bias the seat back 14 toward the second position when the second arm 112 engages the drive plate flange 102 and may be free to rotate about the axis 18 and may not bias the seat back 14 toward the second position when the second arm 112 is disengaged from the drive plate flange 102. The second arm 112 may disengage the drive plate flange 102 when the seat back 14 is in a predetermined angular position. For example, the second arm 112 may disengage the drive plate flange 102 when the seat back 14 is near a vertical position as will be discussed in more detail below.

The spacer 68 may be disposed between the spring 66 and the bearing 60. In at least one embodiment, the spacer 68 may be configured as a compressible foam washer that may extend around and receive the shaft 62. The spacer 68 may bias the spring 66 toward or against the drive plate 64 to inhibit rattling of the spring 66 while accommodating rotational movement of the spring 66 and expansion and retraction of the spring coils. For instance, the spacer 68 may bias the spring 66 toward the drive plate 64 while also permitting the coils of the spring 66 or the body length of the spring 66 to increase or expand when the spring 66 is in tension, such as when the seat back 14 is in the first position, or retract or decrease in body length when tension is released, such as when the seat back 14 is in the second position.

Referring to FIGS. 5-7, folding of the seat back 14 from the first position to the second position will now be described in more detail. In FIGS. 5-7, the cross member 44 and a portion of the fold assist mechanism 34 are sectioned along line 5-5 in FIG. 3 to better show the spring 66 and drive plate flange 102.

In FIG. 5, the seat back 14 is shown in the first position. In the first position, the spring 66 is in tension and exerts a biasing force on the seat back frame 32 due to engagement of the first arm 110 and the cross member 44 and engagement of the second arm 112 and the drive plate flange 102. The seat back 14 may remain in the first position when the latch mechanism 20 inhibits rotational movement of the seat back 14 about the axis 18. The seat back 14 may pivot about the shaft 62 toward the second position under the biasing force of the spring 66 when the latch mechanism 20 is released.

In FIG. 6, the seat back 14 is rotated about the axis 18 in a clockwise direction from the position shown in FIG. 5. This seat back 14 rotates about the axis 18 due to the biasing force exerted by the spring 66. The first arm 110 remains in engagement with the cross member 44 and the second arm 112 is shown just prior to disengagement from the drive plate flange 102. The second arm 112 may disengage the drive plate flange 102 when the seat back 14 is disposed between the first and second positions. For instance, the angular position of the seat back 14 at which the second arm 112 disengages the drive plate flange 102 may be at or near a vertical position (e.g., ±15°) of the seat back 14 or seat back frame 32. For instance, the second arm 112 may disengage the drive plate flange 102 when the seat back is vertical, shortly after the seat back 14 is vertical, or shortly before the seat back 14 becomes vertical, thereby allowing the momentum of the seat back 14 continue to rotate the seat back 14 past vertical and toward the second position.

In FIG. 7, the seat back 14 is rotated further about the axis 18 from the position shown in FIG. 6 and is shown in the second position or folded position. In the second position, rotational movement of the seat back 14 may stop due to engagement of the seat back 14 with the seat bottom 12. In the second position, the spring 66 may rotate about the axis 18 and may not exert a biasing force against the seat back frame 32. The first arm 110 may engage the cross member 44 while the second arm 112 may disengage and be spaced apart from the drive plate flange 102.

The seat back 14 may be returned to the first position by rotating the seat back 14 in a counterclockwise direction from the perspective shown. For example, the seat back may be manually or electrically actuated to rotate the seat back 14 about the axis 18. Rotation of the seat back 14 may rotate the spring 66 in a counterclockwise direction about the axis 18 due to engagement of the cross member 44 and the first arm 110. Sufficient rotation of the spring 66 causes the second arm 112 to reengage the drive plate flange 102. As the seat back 14 continues to rotate toward the first position, potential energy may be stored in the spring 66 and tension may increase. The latch mechanism 20 may be reengaged to hold the seat back 14 stationary when the seat back 14 reaches the first position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a mounting bracket configured to be mounted on a support surface;
   a seat back that has a seat back frame and is configured to move between a first position and a second position; and
   a fold assist mechanism that includes:
   a shaft that is disposed proximate the mounting bracket and that supports the seat back frame,
   a drive plate that is disposed proximate the shaft and has a drive plate flange that is spaced apart from the shaft and extends toward the seat back frame, and
   a spring that is rotatably disposed on the shaft;
   wherein the spring exerts a biasing force on the seat back frame that biases the seat back toward the second position when the spring engages the drive plate flange.

2. The seat assembly of claim 1 wherein the spring does not bias the seat back toward the second position when the spring is disengaged from the drive plate flange.

3. The seat assembly of claim 1 wherein the spring is disposed between the drive plate and the seat back frame.

4. The seat assembly of claim 1 wherein the seat back frame has first and second side members and a cross member that extends from the first side member to the second side member, wherein the spring engages the cross member.

5. The seat assembly of claim 4 wherein the spring has a first arm that engages the cross member and a second arm that is disposed opposite the first arm, wherein the second arm engages the drive plate flange when the spring biases the seat back frame toward the second position.

6. The seat assembly of claim 5 wherein the first arm engages the cross member and the second arm is spaced apart from the drive plate flange when the seat back is in the second position.

7. The seat assembly of claim 5 wherein the second arm disengages the drive plate flange when the seat back is substantially vertical.

8. The seat assembly of claim 5 wherein the first arm is longer than the second arm.

9. A seat assembly comprising:
a mounting bracket;
a seat back that is configured to pivot about an axis between a first position and a second position, wherein the seat back has a seat back frame that includes a side member having a side member hole and a cross member that is disposed proximate the side member; and
a fold assist mechanism that includes:
a shaft that is fixedly disposed on the mounting bracket and that extends through the side member hole to pivotally support the seat back frame,
a drive plate that is fixedly disposed on the shaft and has a drive plate flange that is spaced apart from the shaft, and
a spring that is rotatably disposed on the shaft;
wherein the spring exerts a biasing force on the cross member to bias the seat back toward the second position when the spring engages the drive plate flange.

10. The seat assembly of claim 9 wherein the side member is spaced apart from the mounting bracket.

11. The seat assembly of claim 9 further comprising a bushing that extends between the side member and the mounting bracket.

12. The seat assembly of claim 11 further comprising a bearing that is disposed in the side member hole and the bushing.

13. The seat assembly of claim 12 wherein the shaft extends through the bearing and the bushing.

14. The seat assembly of claim 12 wherein the bearing has a bearing flange that is disposed at an end of the bearing and that extends radially away from the axis.

15. The seat assembly of claim 14 wherein the spring is disposed between the bearing flange and the drive plate.

16. The seat assembly of claim 14 further comprising a spacer having a hole that receives the shaft, wherein the spacer is disposed between the bearing flange and the spring.

17. A seat assembly comprising:
a mounting bracket;
a seat back that is configured to pivot about an axis between a first position and a second position, wherein the seat back has a seat back frame; and
a fold assist mechanism that includes:
a shaft that supports the seat back frame and has a first portion and a second portion, wherein the first portion is fixedly disposed on the mounting bracket and the second portion is disposed opposite the first portion,
a drive plate that is fixedly disposed on the second portion of the shaft and has a drive plate flange that is spaced apart from the shaft and extends toward the seat back frame, and
a spring that is rotatably disposed on the shaft;
wherein the spring biases the seat back toward the second position when the spring engages the seat back frame and the drive plate flange.

18. The seat assembly of claim 17 wherein the first portion of the shaft has a first protrusion that is received in a mounting hole of the mounting bracket, wherein the first protrusion and mounting hole cooperate to inhibit rotation of the shaft with respect to the mounting bracket.

19. The seat assembly of claim 17 wherein the second portion of the shaft has a second protrusion that is received in a drive plate hole of drive plate, wherein the second protrusion and drive plate hole cooperate to inhibit rotation of the drive plate with respect to the shaft.

20. The seat assembly of claim 17 wherein the first portion has a first diameter and the second portion has a second diameter, wherein the first portion extends through a side member of the seat back frame and the spring extends around the second portion.

* * * * *

UNITED STATES PATENT AND TRADEMARK OFFICE
CERTIFICATE OF CORRECTION

| | | |
|---|---|---|
| PATENT NO. | : 8,899,679 B2 | Page 1 of 1 |
| APPLICATION NO. | : 13/625084 | |
| DATED | : December 2, 2014 | |
| INVENTOR(S) | : Chris Edwards et al. | |

It is certified that error appears in the above-identified patent and that said Letters Patent is hereby corrected as shown below:

In the Claims

Column 8, Line 28, Claim 19:

After "received in a drive plate hole of"
Insert -- the --.

Signed and Sealed this
Thirty-first Day of March, 2015

Michelle K. Lee
*Director of the United States Patent and Trademark Office*